US007457638B2

(12) United States Patent
Dhillon et al.

(10) Patent No.: US 7,457,638 B2
(45) Date of Patent: Nov. 25, 2008

(54) SHORT MESSAGE SERVICE ENCAPSULATION OF SUPPLEMENTARY SERVICE REQUESTS FOR IMS

(75) Inventors: Harry S. Dhillon, Monmouth Junction, NJ (US); Ruth S. Gayde, Naperville, IL (US); Donna M. Sand, Redmond, WA (US)

(73) Assignee: Lucent Technologies Inc., Murray Hill, NJ (US)

( * ) Notice: Subject to any disclaimer, the term of this patent is extended or adjusted under 35 U.S.C. 154(b) by 466 days.

(21) Appl. No.: 11/126,788

(22) Filed: May 11, 2005

(65) Prior Publication Data

US 2006/0258394 A1 Nov. 16, 2006

(51) Int. Cl.
*H04M 1/00* (2006.01)
(52) U.S. Cl. .............. 455/562.1; 455/433; 455/439; 370/331; 370/401; 370/467
(58) Field of Classification Search .......... 455/466, 455/550.1, 552.1, 432.1, 433, 436, 439; 370/354, 370/400, 401, 328, 329, 331, 352, 466, 467
See application file for complete search history.

(56) References Cited

U.S. PATENT DOCUMENTS

| | | | | |
|---|---|---|---|---|
| 6,167,256 A | * | 12/2000 | Yla-Outinen et al. | 455/417 |
| 6,330,445 B1 | * | 12/2001 | Skog et al. | 455/433 |
| 6,487,602 B1 | * | 11/2002 | Thakker | 709/230 |
| 6,763,226 B1 | * | 7/2004 | McZeal, Jr. | 455/90.2 |
| 2002/0136226 A1 | * | 9/2002 | Christoffel et al. | 370/401 |
| 2003/0092454 A1 | * | 5/2003 | Halim et al. | 455/466 |
| 2004/0209614 A1 | | 10/2004 | Bright et al. | |
| 2004/0264456 A1 | | 12/2004 | Beckmann et al. | |
| 2005/0050144 A1 | * | 3/2005 | Borin | 709/206 |
| 2005/0197142 A1 | * | 9/2005 | Major | 455/466 |
| 2006/0198334 A1 | * | 9/2006 | Civanlar et al. | 370/328 |

FOREIGN PATENT DOCUMENTS

| | | |
|---|---|---|
| WO | WO 00/56091 | 9/2000 |
| WO | WO 2004/068879 | 8/2004 |

\* cited by examiner

*Primary Examiner*—Edward Urban
*Assistant Examiner*—Nhan T. Le

(57) ABSTRACT

An apparatus in one example has: at least a first network of a first predetermined type and at least a second network of a predetermined type; at least one mobile terminal movable between the first and second networks; at least one gateway operatively coupled to each of the first and second networks; and at least one message that communicates via the gateway at least feature data of the mobile terminal from one of the first and second networks to the other of the first and second networks.

13 Claims, 8 Drawing Sheets

SHORT MESSAGE SERVICE ENCAPSULATION OF SUPPLEMENTARY SERVICE REQUESTS FOR IMS

TECHNICAL FIELD

The invention relates generally to telecommunication systems, and more particularly to telecommunication systems in which supplementary service requests made in one network are available in another network.

BACKGROUND

Today there exist multiple types of wireless wide-area network types. These include Second Generation networks (CDMA, TDMA and GSM) that support Circuit-Switched (CS) voice and data services as well as Third Generation Networks (cdma2000, UMTS) that support Circuit-Switched (CS) voice and Packet-Switched (PS) data services. Evolution of Second Generation networks may also support CS and PS data services, albeit over air interface technologies and networks that are not as optimized as those in Third Generation networks.

Each type of Second Generation (2G) and Third Generation (3G) network, consist of Radio Access Networks (RAN) interconnecting multiple type of UE (user equipment) (e.g., handsets) to a CS or PS Core Network (CN), over specific air interface technologies unique to the network type. A cellular CS CN consists of a variety of functional elements, including, but not limited to, one or more instance of a Mobile Switching Centers (MSC) and Home/Visiting Location Register (H/VLR). Signaling within the CS CN is based on an ANSI-41 (CDMA, TDMA, cdma2000,) or MAP (GSM, UMTS) using interfaces based on Signaling System No. 7. A cellular PS CN consists of packet data nodes such as a GPRS Support Node (GSN) or Packet Data Serving Node (PDSN), for GSM/TDMA/UMTS and CDMA, respectively. These elements in turn interface to external packet data networks (PDNs), including those that comprise the global Internet.

In Second and Third Generation Networks, feature application servers (ASs) interface with the CS, or CS and PS CN, respectively to provide client-server based services for UE. For example, a Short Message Service Center (SMS-C) provides short message services to/from UE located within or across CNs owned by different operators.

The IP Multimedia Subsystem (IMS) refers to a core network that supports multimedia services over future evolution of 3G networks, where there exists only a single CN supporting convergent voice and data services, i.e., multimedia services. The multimedia services are based on Voice over IP protocols for signaling and media transport. An IMS CN consists of a variety of standardized functional elements, including, but not limited to, one or more instances of a Call Session Control Function (CSCF), Breakout Gateway Control Function (BGCF), Media Gateway Control Function (MGCF), Home Subscriber Server (HSS), Media Gateways (MGW), and Application Server (AS). Signaling within the IMS CN is based on the Session Initiation Protocol (SIP) using any interface compatible with the Internet Protocol (IP). Herein, IMS is defined as the system specified by the Third Generation Partnership Project (3GPP) and Third Generation Partnership Project 2 (3PP2).

In a cellular context, the IMS can be deployed in conjunction with a Third Generation RAN. The IMS can also interwork with external networks, such as today's wired telephony network (PSTN) or external PDNs. However, it can also be deployed in conjunction with other RANs (Wi-Fi, Wi-MAX, etc.) and wireline access networks (e.g., ADSL, Cable, Fiber, etc.).

In the IMS CN, a variety of feature application servers (ASs) may exist to client-server based services for particular UE configurations. A primary difference between non-IMS and IMS based networks is that, in the latter case, application servers increasingly realize multimedia based services and increasingly interface with the PS CN (the IMS CN), unless they expressly designed to interface between PS and legacy CS CNs.

Wireless UE may consist of distinct mobile terminals (MT) and terminal equipment (TE)—such as a Personal Computer (PC) containing a wireless adapter card compatible with a RAN type—or consist of an integrated MT and TE—such as a mobile phone (handset). Of course, hybrid types of UE are also possible, differing in the type of MT (e.g., the PC can take the form of a laptop PC or a Personal Digital Assistant (PDA)), or level of integration between between MT and TE components (e.g., PDA phone).

In today's varied networks, the entity that keeps track of a subscriber's features for one network may not be the same as the entity keeping keep track of his features in another network. For example, in the CS CN of cellular networks, an HLR is the aforementioned entity, whereas in an IMS CN, an AS may be the aforementioned entity, if it is not the HSS. It is important to keep disparate feature stores synchronized in scenarios where both types of CNs are deployed in parallel and where a subscriber subscribes to similar services. For example, if a subscriber in a GSM network activates call-forwarding service, he would expect that feature to be activated for him in a IMS network when accessing that same feature using the latter. And conversely, there is a need to for feature actions made in the IMS network to propagate to the HLR in the GSM network.

Depending on the service architecture and interfaces available, the IMS network may not be able to get subscriber supplementary service information directly from the HLR. Thus there is a need for a system in which cellular-based feature actions are propagated into IMS, without requiring that the HLR have a direct interface for subscriber information into IMS. Furthermore, there is also a need for feature actions, made in IMS, to propagate to the wireless HLR.

SUMMARY

The invention in one implementation encompasses an apparatus. The apparatus may comprise: at least a first network of a first predetermined type and at least a second network of a predetermined type; at least one mobile terminal movable between the first and second networks; at least one gateway operatively coupled to each of the first and second networks; and at least one message that communicates via the gateway at least feature data of the mobile terminal from one of the first and second networks to the other of the first and second networks. A smart client may be in the handset that has the ability to turn SS requests into SMS messages and vice versa.

Another implementation of the invention encompasses a method. The method may comprise: capturing supplementary service requests that are made while a mobile terminal is in one of a cellular-based network and an IMS network; and communicating the supplementary service request between the cellular-based network and the IMS network such that each of the cellular-based network and the IMS network have current features associated with the mobile terminal when the mobile terminal is within a respective coverage area of the cellular-based network and the IMS network.

DESCRIPTION OF THE DRAWINGS

Features of exemplary implementations of the invention will become apparent from the description, the claims, and the accompanying drawings in which:

DETAILED DESCRIPTION

Implementations of the present method and apparatus capture supplementary service requests that are made while a subscriber is in a legacy CS CN (e.g., CDMA, TDMA, GSM) and provides these requests to an IMS CN. These implementations do not place any new requirements on the CS CN, as they exist today. Also, the implementations are applicable to any type of wired or wireless access network, as described above.

In the following, "supplementary services" refer to enhanced treatments applied to basic telephony (speech) calls. They include, but are not limited to, services such as Call Forwarding, Call Transfer, Multi-Party Calling, etc., which are considered services in their own right. These treatments (services) may apply to either originating or terminating calls.

When a subscriber makes a supplementary service request (e.g., activate call forwarding service), the mobile terminal encapsulates the supplementary service request in a pre-defined format in a Short Message Service (SMS) message. It may do this in addition to or instead of the normal method of sending the request to an HLR via an MSC. The mobile terminal sends the SMS message to a specific DN (Directory Number), which points to an address in the IMS network associated with a feature application server. The feature application server will receive the SMS message, unpack it, and file the supplementary service action appropriately for that subscriber. Although there is no standard format for the "text" part of the SMS message, the format of the message will have been previously agreed to by bilateral agreement between the mobile terminal (client software in the mobile terminal or other device) and the feature application server. That is, the mobile terminal and the feature application server must use the same format for encapsulating the supplementary service request in a SMS message.

SMS is a service available on most digital mobile phones that permits the sending of short messages (also known as text messages, or more colloquially texts or even txts) between mobile phones and other hand-held devices.

Figure 1:
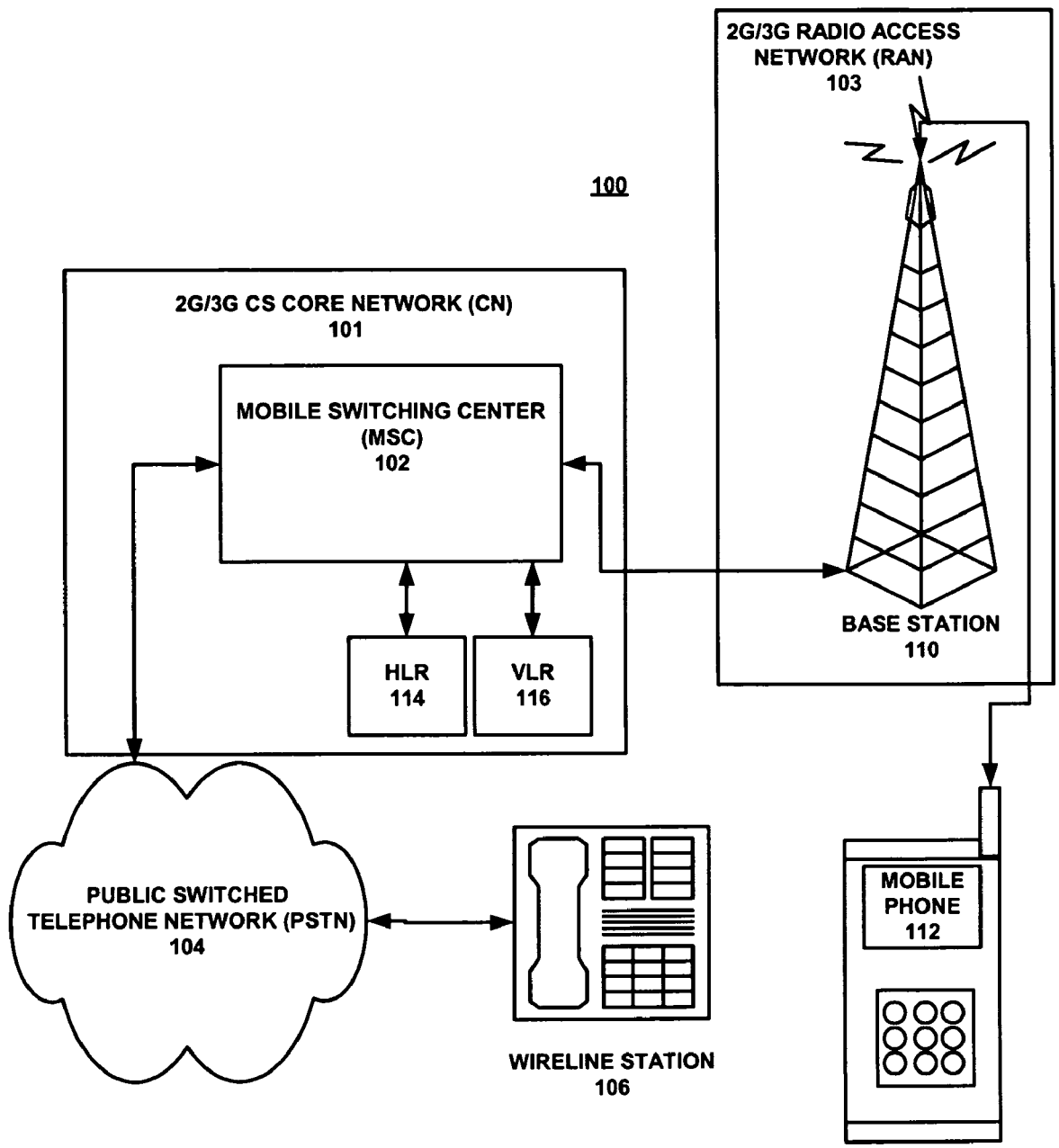
FIG. 1 is a representation of one implementation of a cellular-based network for use with the present apparatus and method.

Referring to FIG. 1, a system 100 is depicted for at least one mobile terminal (also referred to as a mobile phone or mobile station) of a plurality of mobile terminals operatively connected to a communication network. Although the present system and method may be used in any type of system (wired and wireless, for example), the subscriber may typically be a mobile subscriber who uses a mobile terminal (also referred to as mobile phone, a cell phone, mobile handset, car phone). The system (or communication network) 100 may have a mobile switching center (MSC) 102. The system may be, or may be part of, one or more of a telephone network, a local area network (LAN), the Internet, and a wireless network. In the depicted embodiment, a public switched telephone network (PSTN) 104 is connected to the MSC 102. The PSTN 104 routes calls to and from mobile subscribers through the MSC 102. The PSTN 104 also routes calls from and to wireline stations 106. The MSC 102 may also be connected to one or more base stations (BS) 110. Each of the base stations 110 communicates with mobile terminal(s) 112 in its service area. The PSTN 104 generally can be implemented as the worldwide voice telephone network accessible to all those with telephones and access privileges (e.g., AT&T long distance network).

Each of the mobile terminals 112 may be associated with a home location register (HLR) 114 where data about each of the mobile terminals 112 resides. Some of the mobile terminals 112 may be currently registered in the MSC 102, and in that case, a visiting location register (VLR) 116 is set up locally for each mobile terminal 112 that is in a coverage area supported by the MSC 102. HLR 114 can be implemented as a permanent SS7 database utilized in cellular networks.

HLR 114 may be utilized generally to identify/verify a subscriber, and may also contain subscriber data related to features and services. HLR 114 is generally utilized not only when a call is being terminated to a subscriber within a coverage area supported by a cellular provider of record, but also to verify the legitimacy and to support subscriber features when a subscriber is away from his or her home area. Mobile terminal 112 may be implemented as a cellular device, personal communication device, short message service device or wireless communications device (e.g., a wireless personal digital assistant). The HLR 114, the VLR 116 and the MSC 102 may be part of a 2G/3G CS core network (CN) 101. The BS 110 may be part of a 2G/3G radio access network (RAN) 103.

Figure 2:
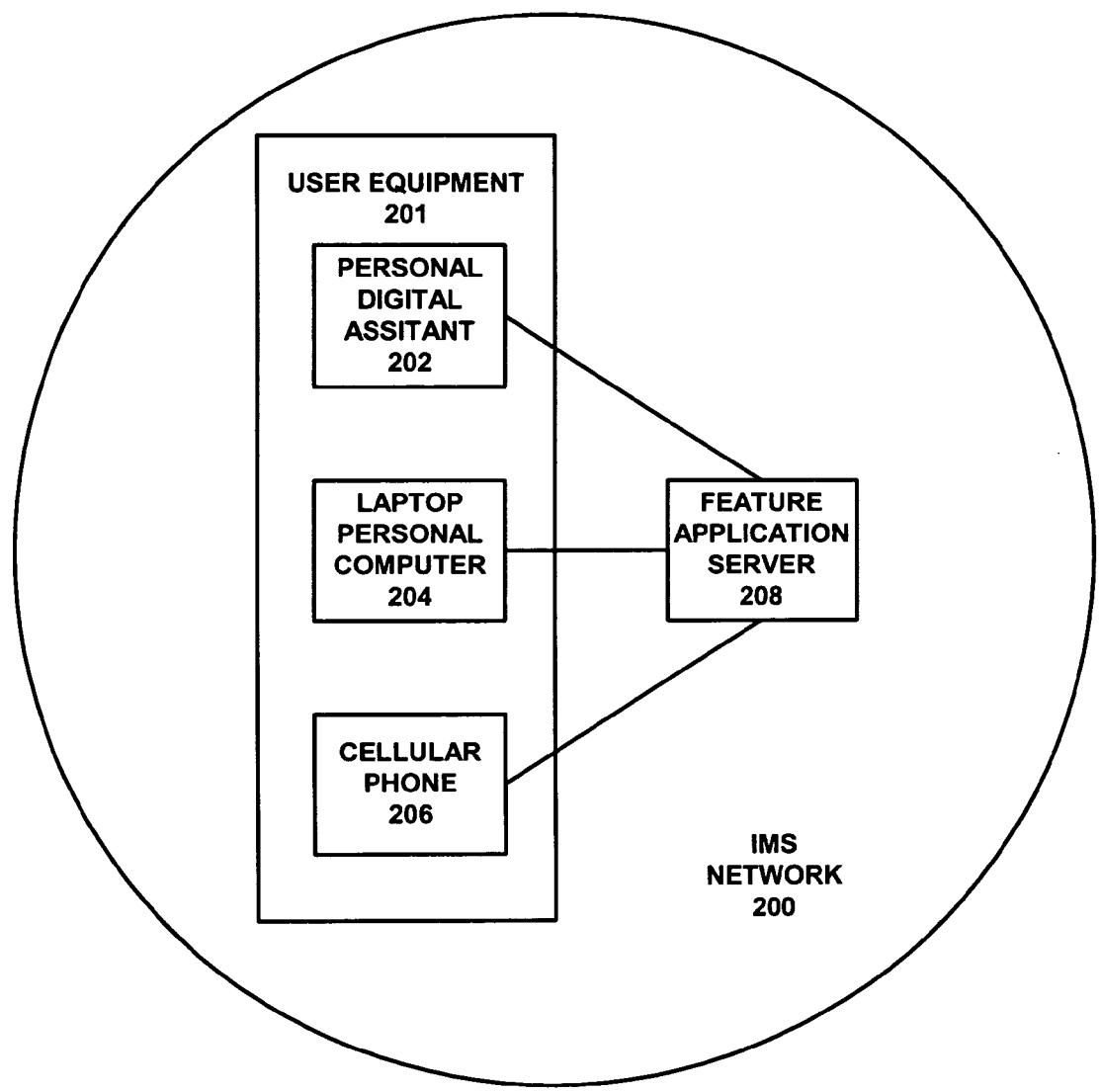
FIG. 2 is a representation of one implementation of an IMS network for use with the present apparatus and method.

FIG. 2 depicts an IMS network 200. The IMS network 200 may have one or more feature application servers 208. The feature application server 208 may be in communication with various subscriber equipment (UE 201), such as, a digital personal assistant 202, a laptop computer 204 and a cellular phone 206.

Figure 3:
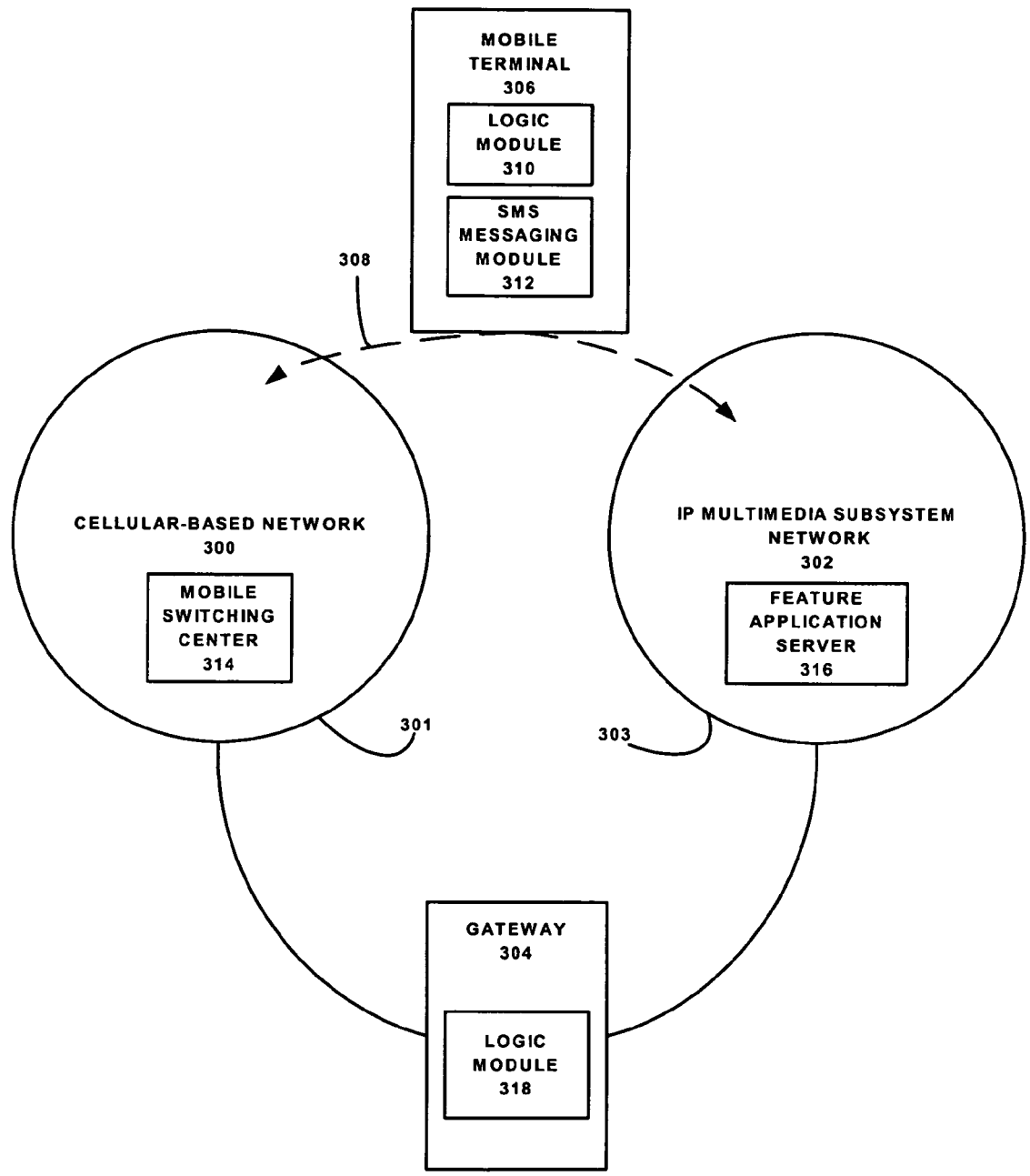
FIG. 3 depicts one implementation of the general implementation of the present apparatus and method for use with, for example, IMS networks and cellular-based networks.

As depicted in FIG. 3 a mobile terminal 300 may travel (for example, along path 308) from the coverage area 301 of the cellular based network 300 to the coverage area 303 of the IMS network 302. As will be further explained below, a gateway 304 may be operatively coupled to both the cellular based network 300 and the IMS network 302. The gateway 304 may also be part of the IMS network 302.

More specifically (see FIG. 302), the mobile terminal 306 may have a logic module 310 that controls the sending of instructions for updating subscriber features. The mobile terminal 306 may also have an SMS message module 312. The mobile terminal 306 may communicate with the gateway 304 via the mobile switching center 314 in the cellular base network 300. The gateway 304 is further operatively coupled to feature application server 316 in the IMS network 302. The gateway 304 may have a logic module 318 for interfacing with the cellular-based network 300 and the IMS network 302.

Figure 4:
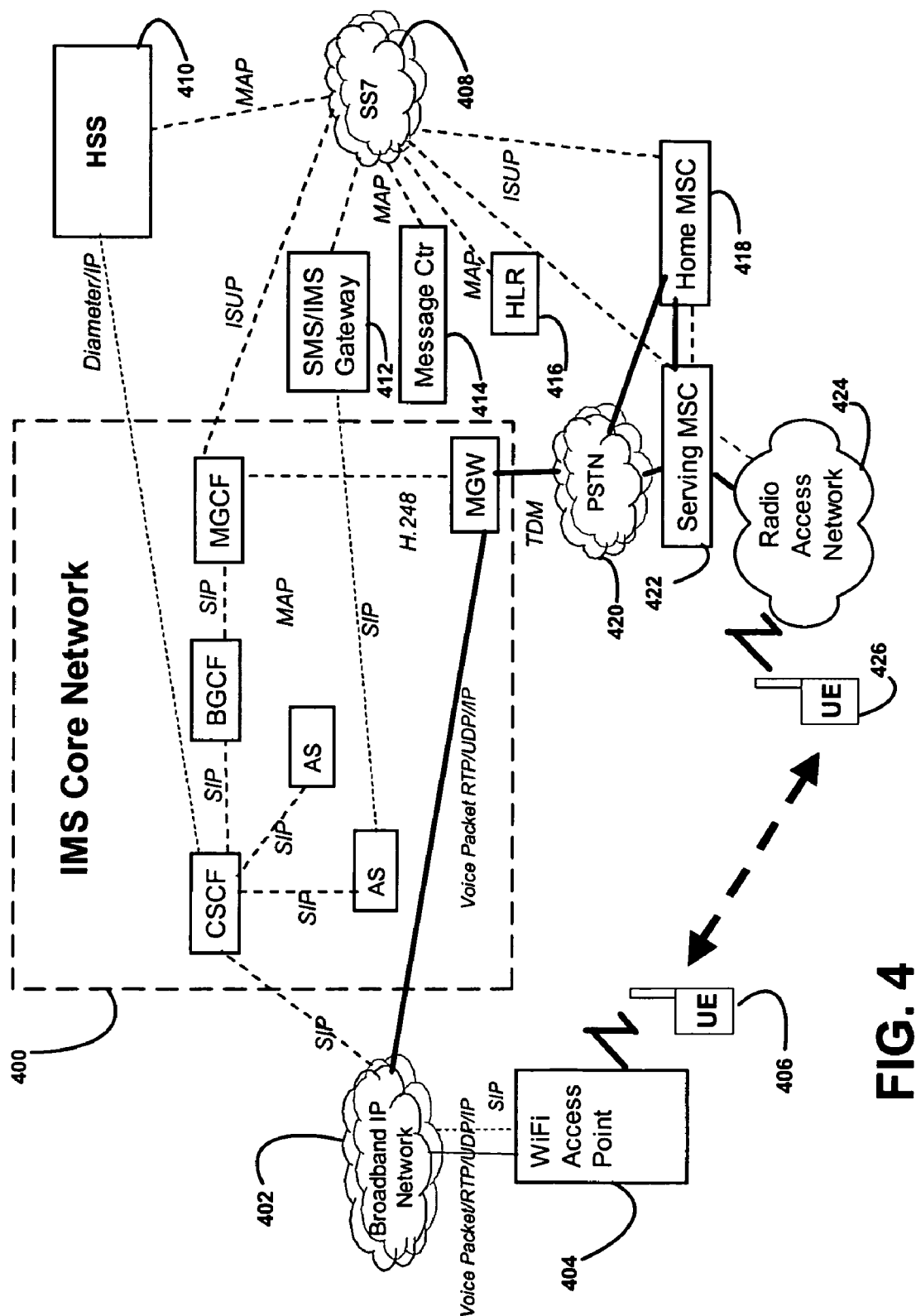
FIG. 4 depicts one implementation of network architecture for the present method and apparatus.

FIG. 4 depicts one implementation of network architecture for the present method and apparatus. The IMS network 400 will have network elements, such as, CSCF (call session control function), BGCF (breakout gateway control function), MGCF (media gateway control function), MGW (media gateway), and AS (application server) in a configuration as depicted in FIG. 4. The IMS network 400 may be operatively coupled to a broadband IP network 402 that may be operatively coupled to a Wi-Fi access point 404. The Wi-Fi access point 404 may be wirelessly coupled to a mobile terminal 406.

The IMS network 400 may also be operatively connected to an HSS (home subscriber server) 410, a supplemental services interworking gateway 412, and a cellular based network (such as SS7) 408. The cellular network 408 may also be operatively coupled to the supplemental services interworking gateway 412, a message center 414, an HLR 416, a home MSC 418, and a serving MSC 422.

The IMS network 400 may also be operatively coupled to a PSTN 420 that may be operatively coupled to the home MSC 418, and to the serving MSC 422. The serving MSC 422 may be operatively coupled to a radio access network 424 that may be wirelessly coupled to mobile terminal 426.

Figure 5:
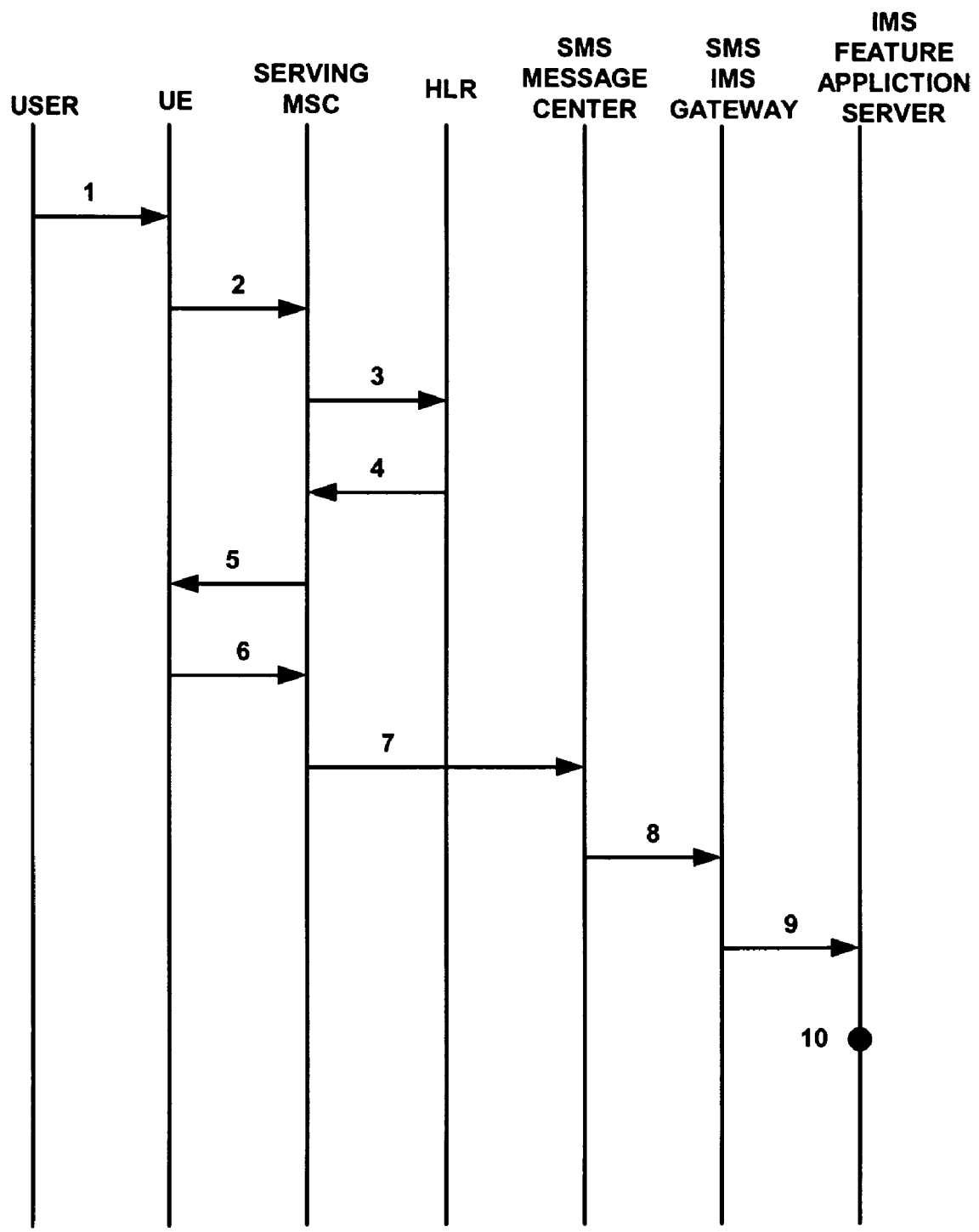
FIGS. 5 and 6 are flow diagrams of an implementation of the method in which supplementary service requests made in one network are available in another network.
Figure 6:
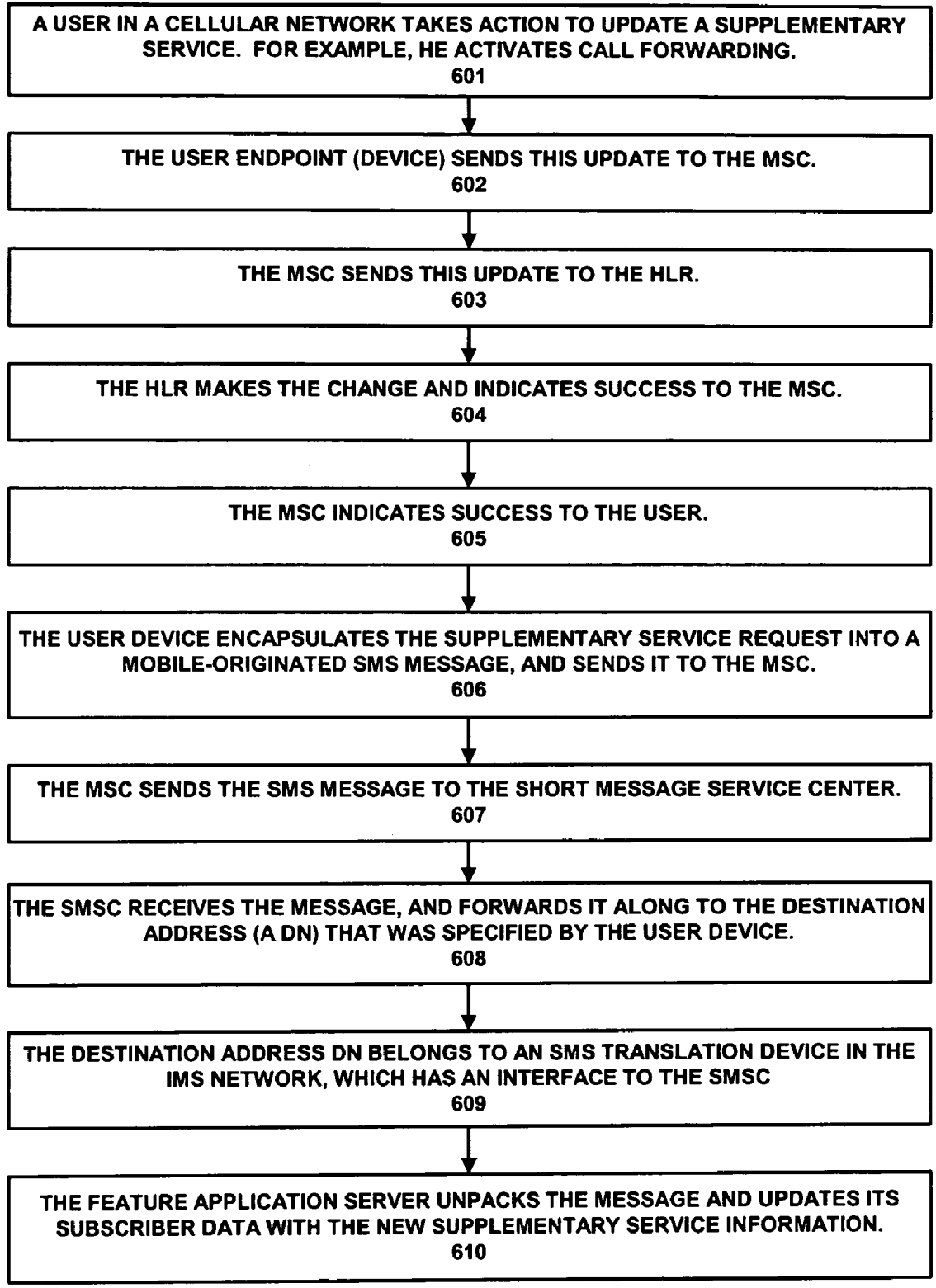

Detailed steps of one implementation, where a mobile terminal moves from a cellular network to an IMS network, are as follows:

1. (FIG. 5) A subscriber in a cellular network takes action to update a supplementary service. For example, he activates call forwarding. This may be accomplished by choosing an action from a menu on the device, or by dialing a series of digits that are predetermined to indicate call forwarding activation. (601, FIG. 6)

2. (FIG. 5) The subscriber endpoint (device) sends this update to the MSC. (602, FIG. 6)

3. (FIG. 5) The MSC sends this update to the HLR. (603, FIG. 6)

4. (FIG. 5) The HLR makes the change and indicates success to the MSC. (604, FIG. 6)

5. (FIG. 5) The MSC indicates success to the subscriber. This may be by sending a specific message, or by playing a tone. (605, FIG. 6)

6. (FIG. 5) The subscriber device encapsulates the supplementary service request into a mobile-originated SMS message, and sends it to the MSC. The mobile terminal already has the destination address, for it is the address of the IMS feature application server. The message includes the "from" address, which is an identifier, such as the subscriber's directory number. Note that in this example, the mobile terminal has waited to get confirmation from the cellular network that the feature activation was successful at the HLR before proceeding with the SMS feature activation. However, in another implementation, the mobile terminal may send the message without awaiting cellular network confirmation. (606, FIG. 6)

7. (FIG. 5) The MSC sends the SMS message to the SMSC. (607, FIG. 6)

8. (FIG. 5) The SMSC receives the message, and forwards it along to the destination address (a DN) that was specified by the subscriber device. (608, FIG. 6)

9. (FIG. 5) The destination address DN belongs to an SMS translation device in the IMS network, which has an interface to the SMSC (e.g., ANSI-41 or MAP protocol). In this example, the SMS/IMS gateway uses the E.164 telephone number to translate into an IMS TEL URL. Alternatively, the SMS/IMS gateway may query an ENUM database or other database to derive a SIP URI (such as Features_R_UsEaol-.com) associated with this E.164 telephone number. The SMS translation device forwards the message with the "From" number of the subscriber to the address which is the feature application server. In some networks, there might be only one feature application server for all subscribers, while in the case of multiple feature application servers, the SMS translation device may derive the feature application server address via either a local database lookup for that subscriber or an HSS query for that subscriber. (609, FIG. 6)

10. (FIG. 5) The feature application server unpacks the message and updates its subscriber data with the new supplementary service information. The feature server may, for example, update the HSS with information about the subscriber's feature update, or it may log the information into some other feature server/subscriber database in the IMS realm. (610, FIG. 6)

Figure 7:
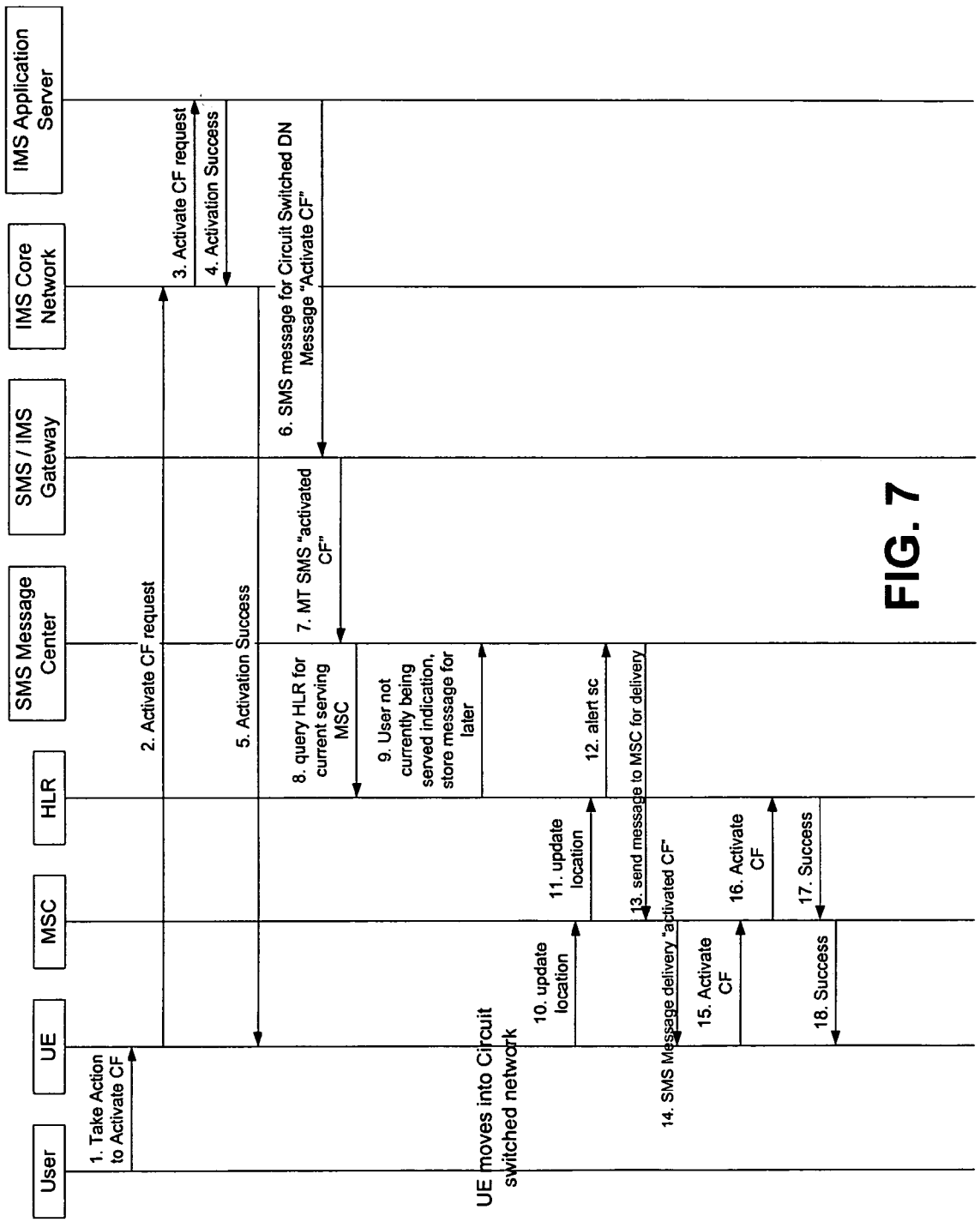
FIGS. 7 and 8 are flow diagrams of another implementation of the method in which supplementary service requests made in one network are available in another network.
Figure 8:
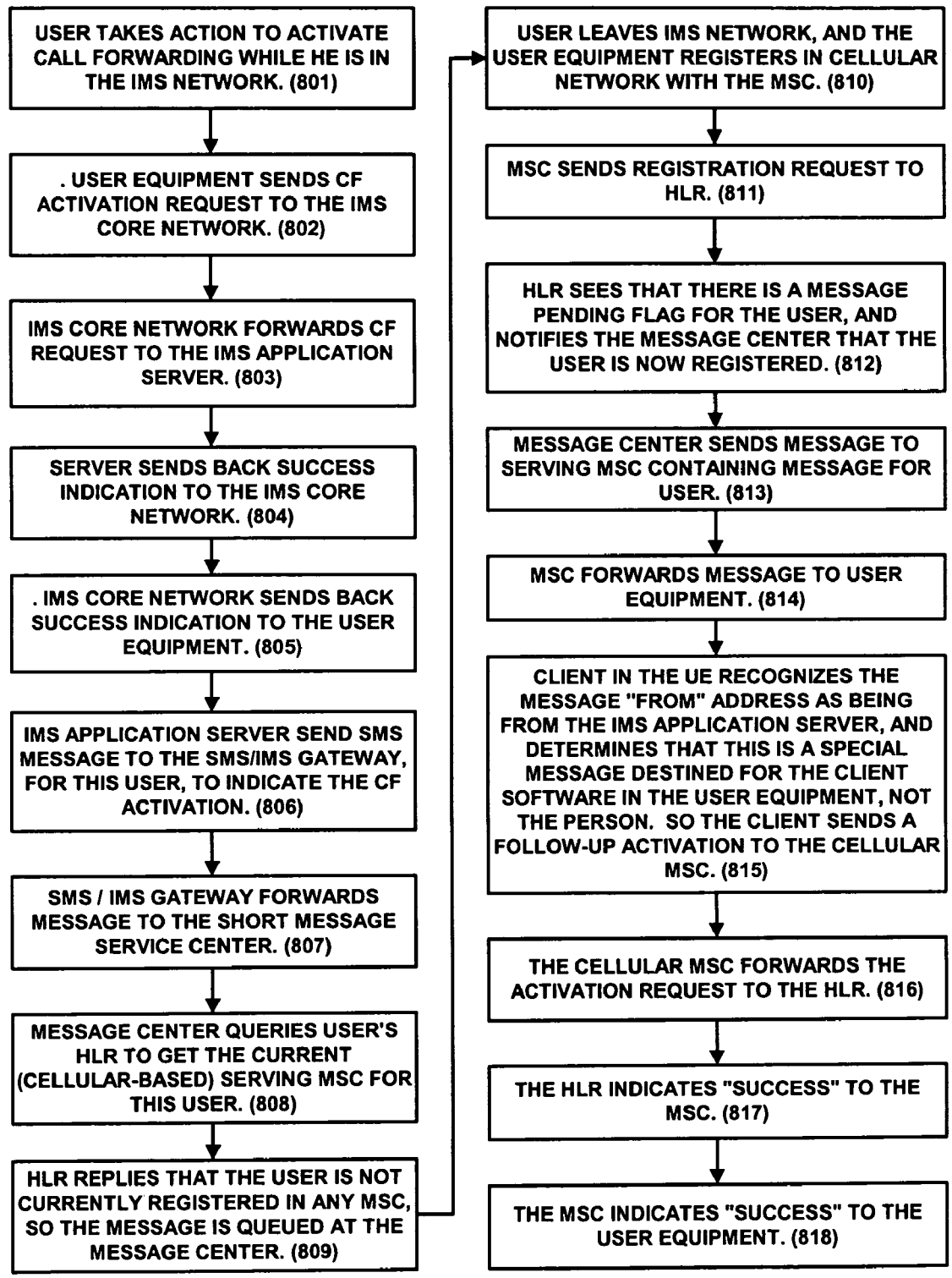

Detailed steps of one implementation, where a mobile terminal is registered in an IMS network, and the supplementary service request is propagated to the cellular HLR and where the mobile terminal moves from the IMS network to the cellular network, are as follows:

1. (FIG. 7) Subscriber takes action to activate call forwarding while he is in the IMS network. (801, FIG. 8)

2. (FIG. 7) Subscriber equipment sends CF activation request to the IMS core network. (802, FIG. 8)

3. (FIG. 7) IMS core network forwards CF request to the IMS application server. (803, FIG. 8)

4. (FIG. 7) Server sends back a success indication to the IMS core network. (804, FIG. 8)

5. (FIG. 7) IMS core network sends back a success indication to the subscriber equipment. (805, FIG. 8)

6. (FIG. 7) IMS Application Server sends encapsulated SMS message to the SMS/IMS gateway, for this subscriber, to indicate the CF activation. (806, FIG. 8)

7. (FIG. 7) SMS/IMS gateway forwards message to the SMSC. (807, FIG. 8)

8. (FIG. 7) SMSC queries subscriber's HLR to get the current (cellular-based) serving MSC for this subscriber. (808, FIG. 8)

9. (FIG. 7) HLR replies that the subscriber is not currently registered in any MSC, so the message is queued at the SMSC. (809, FIG. 8)

10. (FIG. 7) Subscriber leaves IMS network, and the subscriber equipment registers in cellular network with the MSC. (810, FIG. 8)

11. (FIG. 7) MSC sends registration request to HLR. (811, FIG. 8)

12. (FIG. 7) HLR determines that there is a message pending flag for the subscriber, and notifies the SMSC that the subscriber is now registered, with the address of the serving MSC. (812, FIG. 8)

13. (FIG. 7) SMSC sends message to serving MSC containing message for subscriber. (813, FIG. 8)

14. (FIG. 7) MSC forwards message to subscriber equipment. (814, FIG. 8)

15. (FIG. 7) Client software in the subscriber equipment identifies the message "from" address as being from the IMS application server, and determines that this is a special message destined for the client software in the subscriber equipment, not the person. The client software executes sending a follow-up activation to the cellular MSC. (815, FIG. 8)

16. (FIG. 7) The Cellular MSC forwards the activation request to the HLR. (816, FIG. 8)

17. (FIG. 7) The HLR indicates "success" to the MSC. (817, FIG. 8)

18. (FIG. 7) The MSC indicates "success" to the subscriber equipment. (818, FIG. 8)

The mechanism of using SMS as the go-between for the different realms of cellular and IMS may be used for other functions besides supplementary service activations. For example, if there is a voice mail system in the IMS domain, it could send a message waiting indication through the IMS/SMS gateway to effect a change in the message waiting status at the HLR for this user. There may be many types of services in the IMS network for interacting with the subscriber device (such as, the mobile terminal) while the subscriber is in the cellular based network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
   at least a first network of a first predetermined type and at least a second network of a predetermined type;
   at least one mobile terminal movable between the first and second networks;
   at least one gateway operatively coupled to each of the first and second networks; and
   at least one message that communicates via the gateway at least feature data of the mobile terminal from one of the first and second networks to the other of the first and second networks;
   wherein the mobile terminal and a feature application server use a predetermined format for supplementary service encoding, and wherein the mobile terminal is operable to make at least one supplementary service request to activate call forwarding service via the message.

2. The apparatus according to claim 1, wherein one of the first and second networks in an IP Multimedia Subsystem (IMS) network, and wherein the IMS network has the feature application server.

3. The apparatus according to claim 1 wherein the mobile terminal is one of a cellular phone and an IP Multimedia Subsystem (IMS)-capable device.

4. The apparatus according to claim 1, wherein the mobile terminal is part of a user equipment configuration having a plurality of distinct user equipment types, and wherein at least one of the distinct user equipment types is one of IP Multimedia Subsystem (IMS)-compatible or have a mode of operation that is IMS-compatible.

5. The apparatus according to claim 1, wherein the first network is a cellular-based network, and wherein the second network is an IP Multimedia Subsystem (IMS) network.

6. The apparatus according to claim 5, wherein the gateway is part of the IMS network.

7. The apparatus according to claim 1, wherein the message is a Short Message Service (SMS) message.

8. The apparatus according to claim 1, wherein the mobile terminal has a message module that originates a Short Message Service (SMS) message and wherein the gateway has an interface module that forwards the SMS message.

9. The apparatus according to claim 8, wherein the first network is a cellular-based network that has a mobile switching center, and wherein the second network is an IP Multimedia Subsystem (IMS) network that has the feature application server and an SMS translation module.

10. A method, comprising the steps of:
    capturing supplementary service requests that are made while a mobile terminal is in one of a cellular-based network and an IP Multimedia Subsystem (IMS) network; and
    communicating the supplementary service request between the cellular-based network and the IMS network such that each of the cellular-based network and the IMS network have current features associated with the mobile terminal when the mobile terminal is within a respective coverage area of the cellular-based network and the IMS network;
    employing the mobile terminal to make at least one supplementary service request to activate call forwarding service;
    wherein, when the mobile terminal is in the cellular-based network, the mobile terminal encapsulates the supplementary service request into a mobile-originated SMS message having a predetermined format with a destination number of a feature application server in the IMS network.

11. The method according to claim 10, wherein the feature application server in the IMS network unpacks the SMS message and updates its subscriber data with new supplementary service information, and wherein the mobile terminal and the feature application server use a predetermined format for supplementary service encoding.

12. The method according to claim 10 wherein the mobile terminal is a cellular phone.

13. The method according to claim 10 wherein the mobile terminal is an IMS-capable device.

* * * * *